Figure 1:
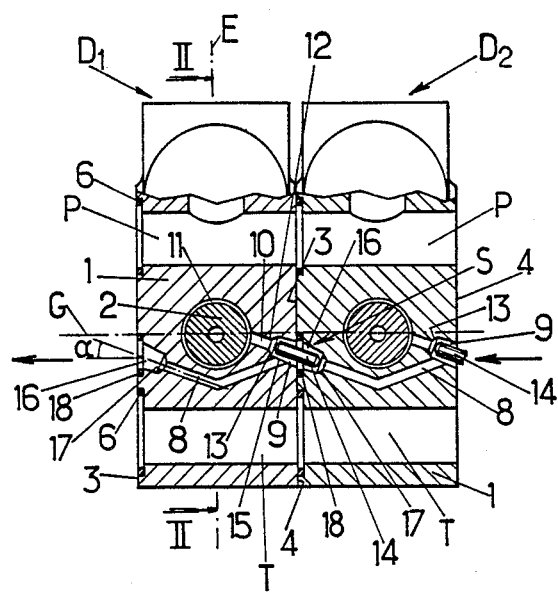

United States Patent [19]

Constantinian

[11] Patent Number: 4,570,671
[45] Date of Patent: Feb. 18, 1986

[54] FLUID DISTRIBUTORS

[75] Inventor: Krikor Constantinian, Bron, France

[73] Assignee: Rexroth Sigma, Venissieux, France

[21] Appl. No.: 574,032

[22] Filed: Jan. 26, 1984

[30] Foreign Application Priority Data

Jan. 27, 1983 [FR] France .............................. 83 01248

[51] Int. Cl.[4] .............................................. F15B 13/08
[52] U.S. Cl. .................................. 137/596; 137/112; 137/596.13; 137/884
[58] Field of Search ................... 137/112, 596, 596.13, 137/884

[56] References Cited

U.S. PATENT DOCUMENTS

| | | | |
|---|---|---|---|
| 1,529,384 | 3/1925 | Adams | 137/112 |
| 3,234,963 | 2/1966 | Lyon | 137/884 |
| 3,718,159 | 2/1973 | Tennis | 137/596.13 X |
| 3,881,512 | 5/1975 | Wilke | 137/596.13 |
| 3,910,311 | 10/1975 | Wilke | 137/596 |
| 4,249,557 | 2/1981 | Habiger | 137/112 |
| 4,352,375 | 10/1982 | Williams | 137/596.13 |
| 4,361,169 | 11/1982 | Williams | 137/596.13 |

Primary Examiner—Gerald A. Michalsky
Attorney, Agent, or Firm—Larson and Taylor

[57] ABSTRACT

The fluid distributor (D1) is intended to be stacked against similar distributors (D2); it comprises a distributor body (1) in which a slide-valve (2) may slide; this body comprises a transverse channel (8) extending from one bearing face (3) to another bearing face (4), this channel (8) being intended to be combined with at least one pressure selector (S); an upstream housing (9) is connected by a duct (10) to a zone where a working pressure is established, this upstream housing (9) being further connected laterally to said channel (8). The distributor body (1) comprises on its face (3), intended to be turned downstream, a downstream housing (16) communicating with the transverse channel (8), the upstream housing (9) of a downstream distributor (D1) coming, in a stack, opposite the downstream housing (16) of the adjacent upstream distributor (D2) so as to form the pressure selector (S).

8 Claims, 2 Drawing Figures

U.S. Patent  Feb. 18, 1986  4,570,671

FLUID DISTRIBUTORS

The invention relates to a pressurized, more especially hydraulic, fluid distribution of the kind intended to be stacked against others similar distributors and which comprises a distributor body, in which a slide-valve may slide, this body comprising a transverse channel extending from one face of the distributor body, intended for serving as a bearing face in stacking, to another parallel face, this transverse channel being intended to be combined with at least one pressure selector so as to transmit, downstream, the highest of two pressures formed respectively by the pressure upstream of the channel and a working pressure of the distributor, the distributor body comprising on its face intended to be turned upstream, an upstream housing connected by a duct to a zone of the distributor where the working pressure is established, the end of this duct opening into the upstream housing and being provided with a seat for a closure member, this upstream housing being further connected laterally to said channel.

Such a fluid distributor is already known for example from U.S. Pat. No. 4,361,169.

The aim of the invention is especially to make fluid distributors of the above kind such that they are of a simpler and more reliable construction, more especially in so far as formation of the pressure selector and incorporation thereof in the distributor are concerned.

According to the invention, a pressurized, more especially hydraulic, fluid distributor of the kind in question is characterized by the fact that the distributor body comprises, on its other face, intended to be turned downstream, a downstream housing communicating with the transverse channel, the end of the channel which opens into this housing being provided in the form of a seat for another closure member, the whole being such that, in a stack, the upstream housing of a downstream distributor comes opposite the downstream housing of the adjacent upstream distributor, the connection of these two housings together with a closure member imprisoned in the chamber formed by these two housings ensuring the formation of the pressure selector; advantageously, the axis of the downstream housing of the upstream distributor is aligned with the upstream housing of the downstream distributor.

Preferably, the upstream housing and the downstream housing of the same distributor body are formed by holes with parallel axes which are slanting with respect to a direction perpendicular to the bearing faces of the distributor body.

These housings may have a truncated cone shape whose section decreases progressively in the direction of the seat of a closure member, so as to facilitate positioning of this member on the seat.

Preferably, the axis of the downstream housing merges with the axis of the part of the channel opening into this housing, whereas the axis of the upstream housing merges with the axis of the duct opening into this housing.

The closure member may be formed by a cylindrical needle, whose ends are rounded so as to be sealingly applied against the seats, this needle being housed substantially half in one and half in the other body of two stacked distributors.

The invention consists, apart from the above mentioned arrangements, of certainother arrangements which will be more explicitly discussed hereafter in connection with a particular embodiment described in detail with reference to the accompanying drawings, but which is in no wise limiting.

IN THESE DRAWINGS

Figure 2:
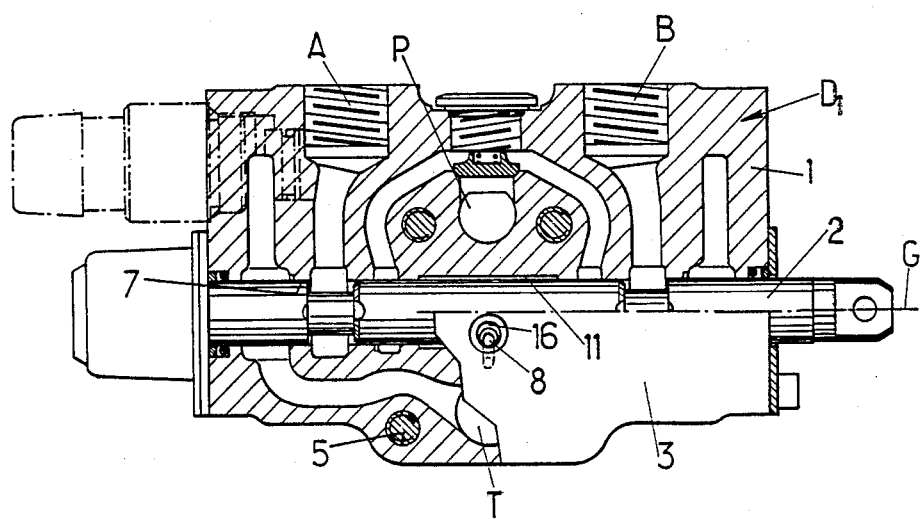

FIG. 1 is a cross section, with parts on the outside, of two stacked pressurized fluid distributors in accordance with the invention; and FIG. 2 is a longitudinal section, with a part on the outside, of one of the distributors, along line 2—2 at FIG. 1.

Referring to FIG. 1, a stack of two pressurized fluid distributors D1, D2 can be seen. These two distributors are identical and the following description will concern essentially distributor D1, situated on the left hand side of FIG. 1, and shown in FIG. 2. It is clear that all the explanations given for D1 are valid for D2. The numerical references used for D1 are repeated, without other explanations, for designating similar elements in D2.

Each distributor such as D1 comprises a distributor body 1 in which a slide-valve 2 may slide longitudinally establishing in a way known per se, depending on the positions it occupies, the desired connections between two orifices A and B for connecting to the user apparatus and, respectively a pressurized fluid input P and an output T towards a liquid reservoir at atmospheric pressure. Distributor body 1 has substantially the form of a rectangular parallelepiped having two transverse parallel faces 3, 4 intended to serve as the bearing surface during the formation of a stack. Body 1 has smooth holes, such as 5 (FIG. 2) passing therethrough for clamping body 1 against the others in the stack by means of bolts or threaded rods.

As can be seen in FIG. 1, the pressure input P and output T towards the reservoir comprise cylindrical passages which are sealingly aligned through seals such as 6 during stacking of bodies 1. Input P and output T are connected by channels provided in the distributor body 1, as can be seen in FIG. 2, to annular chambers surrounding the slide-valve 2 mounted in a bore 7 of body 1.

A transverse channel 8 (FIG. 1) is provided, more especially in the form of a V, formed by two bores which slant with respect to a direction perpendicular to faces 3 and 4 and which are symmetrical with respect to the mean longitudinal plane E of the distributor body. This channel 8 extends from the bearing face 3 to the other bearing face 4 while avoiding the longitudinal bore 7 and is intended to be combined with at least one pressure selector so as to transmit, downstream, that is to say leftwards in the representation of FIG. 1, the highest of two pressures formed respectively by the pressure upstream of channel 8 and a working pressure of distributor D1.

The distributor body 1 comprises, on its face 4 intended to be turned upstream, an upstream housing 9 connected by a duct 10 to a zone 11 of the distributor where the working pressure is established. This zone 11, in the embodiment shown in the drawings, is formed by an annular chamber provided in the distributor body and surrounding the central part of the slide-valve 2. Another pressure selector (not shown in the drawings) is advantageously provided for causing the highest of the two pressures at orifices A and B to reign in zone 11. The end 12 of duct 10 opening into the upstream housing 9 in the axial direction of duct 10, is provided with a seat 13 for a closure member formed by a cylindrical needle 14 with rounded ends, adapted so as to be sealingly applied against a seat such as 13. The closure member could possibly be formed in another way, for example in the form of a ball. Duct 10 is rectilinear and coaxial to housing 9; this duct 10 is slanting with respect to plane G passing through the axis of bore 7 and perpendicular to face 4.

The upstream housing 9 is further connected, laterally, to duct 8, that is to say that duct 8 opens into a zone 15 of this lateral wall of housing 9.

The distributor body 1 comprises, on its other face 3 intended to be turned downstream, a downstream housing 16 communicating axially with the transverse channel 8. The end of this channel opening into housing 16 is adapted in the form of a seat 17 for another closure member, not shown, but which would also be formed by a needle 14.

The assembly is such that, in a stack, for example the one formed by distributors D1, D2, the upstream housing 9 of the downstream distributor D1 comes opposite the downstream housing 16 of the upstream distributor D2 adjacent to the axes of aligned housings 9 and 16. The junction of these two housings 9, 16 with imprisonment of the closure member formed by needle 14 ensures the formation of selector S, each housing 9, 16 corresponding substantially to a half of a selector. Needle 14 is housed substantially half in one and half in the other body of the distributor. If the upstream pressure of channel 8 of distributor D2 (i.e. the pressure in channel 8 of distributor D situated upstream) is higher than the working pressure of D1 reigning in duct 10, needle 14 is applied against seat 13 and closes this duct, so that the pressure in channel 8 of the upstream distributor 12 is transmitted downstream into the channel 8 of distributor D1. On the other hand, if the pressure in duct 10 of D1 is greater than that reigning in channel 8 of upstream distributor D2, needle 14 is applied against seat 17 of D2.

Sealing of the junction between housings 9 and 16 of two adjacent distributors is provided by a sealing ring such as 18 mounted in an annular recess surrounding the end of housing 16 opening into face 3.

The upstream housing 9 and the downstream housing 16 of the same distributor D1 are advantageously formed by holes with parallel axes which are slanting by an angle α with respect to the direction perpendicular to the bearing faces 3 and 4. Housings 9 and 6 preferably have the form of a truncated cone whose cross section decreases in the direction of seat 13, 17 of needle 14 so as to facilitate positioning of this latter on the seat.

The distributor in accordance with the invention is of a simple construction and allows selectors 5 to be formed rapidly during stacking.

I claim:

1. A pressurized fluid distributor, such as a hydraulic fluid distributor, intended to be stacked against other similar distributors to form a stack, comprising:
   a distributor body in which a slide-way valve may slide, said distributor body comprising
   (a) an upstream and a downstream face parallel to one another, said faces serving as bearing surfaces in the stack,
   (b) a transverse channel extending from said upstream face to said downstream face;
   a working pressure in said distributor body;
   an upstream pressure from an upstream distributor body;
   complementary portions to which said transverse channel is connected of a pressure selector means formed when the distributor is in the stack for transmitting to said transverse channel the highest of said working pressure and said upstream pressure, said complementary portions of the pressure selector means comprising
   (a) an elongate upstream housing formed in said upstream face, said upstream housing being connected laterally to said transverse channel,
   (b) a duct connecting said upstream housing to said working pressure, said duct having an opening into said upstream housing forming a seat for a closure member,
   (c) an elongate downstream housing formed in said downstream face at a position opposite said upstream housing in said upstream face, said downstream housing communicating with said transverse channel at the end of said transverse channel and forming a seat for another closure member,
   such that in a stack of said fluid distributors said upstream housing of a downstream distributor comes opposite and into communication with said downstream housing of an adjacent upstream distributor at a junction, the junction of these said housings forming a chamber imprisoning a closure member therein which acts as said pressure selector means.

2. The distributor according to claim 1, characterized by the fact that in a stack, the longitudinal axis of the downstream housing (16) of the upstream distributor (D2) is aligned with the longitudinal axis of the upstream housing (9) of the downstream distributor (D1).

3. The distributor according to claim 1, characterized by the fact that the upstream housing (9) and the downstream housing (16) of the same distributor body (1) are formed by elongate holes with parallel longitudinal axes which are slanting with respect to a direction perpendicular to the upstream and downstream faces (3,4) of the distributor body.

4. The distributor according to claim 1, characterized by the fact that the housings (9,16) have the shape of a truncated cone whose section decreases progressively in the direction of the respective seat (13, 17) for the closure member (14) so as to facilitate positioning of this member on the seats.

5. The distributor according to claim 1, characterized by the fact that the longitudinal axis of the downstream housing (16) merges with the longitudinal axis of a part of the transverse channel (8) opening into this housing.

6. The distributor according to claim 1, wherein said duct has a longitudinal axis, and characterized by the fact that the longitudinal axis of the upstream housing (9) merges with the longitudinal axis of the duct (10) opening into this housing.

7. The distributor according to claim 1, characterized by the fact that the duct has an opening (10), on the side opposite the upstream housing (9) which opens into an annular chamber (11) surrounding the slide-valve (2) of the distributor.

8. The distributor according to claim 1, characterized by the fact that each closure member is formed by a cylindrical needle (14) whose ends are round so as to be sealingly applied against the seats of the housings (13, 17) this needle being housed substantially half in the one housing and half in the mating housing of an adjacent distributor (D1, D2).

* * * * *